United States Patent
Mateti et al.

(10) Patent No.: US 11,269,826 B2
(45) Date of Patent: Mar. 8, 2022

(54) VIEW TABLES FRAMEWORK

(71) Applicant: Bank of America Corporation, Charlotte, NC (US)

(72) Inventors: Sravan Mateti, Dallas, TX (US); Nadeem Panjwani, Dallas, TX (US); Vinod Patil, Dallas, TX (US); Sudheer Konduru, Dallas, TX (US); Paul Eric Hazboun, Flower Mound, TX (US); Douglas J. Goddard, Addison, TX (US)

(73) Assignee: Bank of America Corporation, Charlotte, NC (US)

( * ) Notice: Subject to any disclaimer, the term of this patent is extended or adjusted under 35 U.S.C. 154(b) by 76 days.

(21) Appl. No.: 16/773,034

(22) Filed: Jan. 27, 2020

(65) Prior Publication Data
US 2021/0232549 A1 Jul. 29, 2021

(51) Int. Cl.
*G06F 16/21* (2019.01)
*G06F 16/22* (2019.01)
*G06F 16/242* (2019.01)

(52) U.S. Cl.
CPC .......... *G06F 16/214* (2019.01); *G06F 16/211* (2019.01); *G06F 16/2282* (2019.01); *G06F 16/2445* (2019.01)

(58) Field of Classification Search
None
See application file for complete search history.

(56) References Cited

U.S. PATENT DOCUMENTS

| | | | | |
|---|---|---|---|---|
| 5,233,513 A | * | 8/1993 | Doyle | G06F 8/30 705/7.11 |
| 11,165,754 B2 | * | 11/2021 | Pattanaik | H04L 63/12 |
| 2005/0094640 A1 | * | 5/2005 | Howe | H04L 63/20 370/395.1 |
| 2007/0169103 A1 | | 7/2007 | Bhatkhande et al. | |
| 2010/0232322 A1 | * | 9/2010 | Umayabashi | H04L 12/462 370/256 |
| 2011/0282914 A1 | * | 11/2011 | Block | G06F 16/258 707/796 |

(Continued)

OTHER PUBLICATIONS

"Connect: Direct," https://en.wikipedia.org/wiki/Connect:Direct, Wikimedia Foundation, Inc., Sep. 28, 2019.

(Continued)

*Primary Examiner* — Kim T Nguyen
(74) *Attorney, Agent, or Firm* — Weiss & Arons LLP

(57) ABSTRACT

In entity transition from legacy systems to a big data distributed data platform, numerous system-based architectural gaps have surfaced. There exists a need for a bridge component for each of the architectural gaps in order to support the entity transition to the big data distributed data platform. These bridge components include a variety of frameworks that are configured to automate certain processes that are needed for the transition. These processes have only become necessary as a result of the Hadoop platform. The automated processes include a snapshot load platform. The snapshot load platform enables the addition of a new view to the historical tables. The platform includes replacing the entire table in a truncated scenario. The platform includes replacing cases in a refresh or update scenario.

14 Claims, 10 Drawing Sheets

(56) References Cited

U.S. PATENT DOCUMENTS

| | | | | |
|---|---|---|---|---|
| 2013/0245810 | A1* | 9/2013 | Sullivan | ............... B65G 1/1371 700/214 |
| 2016/0021224 | A1* | 1/2016 | Howe | .................... H04L 63/20 370/474 |
| 2019/0243836 | A1 | 8/2019 | Nanda et al. | |
| 2020/0394110 | A1 | 12/2020 | Ramohalli Gopala Rao et al. | |
| 2021/0057614 | A1* | 2/2021 | Liu | .......................... H01L 33/40 |
| 2021/0232538 | A1 | 7/2021 | Konduru et al. | |
| 2021/0232549 | A1 | 7/2021 | Mateti et al. | |
| 2021/0232560 | A1 | 7/2021 | Mateti et al. | |

OTHER PUBLICATIONS

"Create or Replace View in Hive Fails When There Is Are Incompatible Column Type Changes in an Already Existing View," MapR Technologies, Inc., 2018.

"Hive-Insert Overwrite vs. Drop Table + Create Table + Insert Into," https://stackoverflow.com/questions/39618624/hive-insert-overwrite-vs-drop-table-create-table-insert-into, Stack Overflow, 2016.

Jeff Barr, "Hue—A Web User Interface for Analyzing Data With Elastic MapReduce," https://aws.amazon.com/blogs/aws/hue-web-ui-for-emr/, Amazon Web Services, Inc., Nov. 7, 2014.

Carter Shanklin, "Update Hive Tables the Easy Way," https://blog.cloudera.com/update-hive-tables-easy-way-2/, Cloudera, Inc., Aug. 15, 2017.

"Data Lake," https://en.wikipedia.org/wiki/Data_lake, Wikimedia Foundation, Inc., Jan. 2, 2020.

"Data Lake vs. Data Warehouse," https://www.talend.com/resources/data-lake-vs-data-warehouse/, Talend, Retrieved on Jan. 15, 2020.

Margaret Rouse, "Data Lake," TechTarget, Mar. 13, 2019.

Amber Lee Dennis, "Data Lakes 101: An Overview," https://www.dataversity.net/data-lakes-101-overview/, Aug. 25, 2016.

"How to Flatten Data Using Google BigQuery's Legacy vs Standard SQL," https://chartio.com/resources/tutorials/how-to-flatten-data-using-google-bigquerys-legacy-vs-standard-sql/, Chartio, Retrieved on Jan. 16, 2021.

Hakon Hapnes Strand, "What is 'Flatten Data' in a Database?" https://www.quora.com/What-is-flatten-data-in-a-database, Quora, Inc., Jul. 20, 2018.

"Hadoop: Big Data Analysis Framework," www.tutorialspoint.com, Retrieved on Nov. 13, 2019.

"Hibernate (framework)," https://en.wikipedia.org/wiki/Hibernate_(framework), Wikimedia Foundation, Inc., Jan. 13, 2020.

"Hibernate Query Language (HOL)," https://www.javatpoint.com/hql, Retrieved on Jan. 13, 2021.

Bernard Marr, "What Is A Data Lake? A Super-Simple Explanation for Anyone," https://www.forbes.com/sites/bernardmarr/2018/08/27/what-is-a-data-lake-a-super-simple-explanation-for-anyone/, Aug. 27, 2018.

"What is a Data Lake?" https://aws.amazon.com/big-data/datalakes-and-analytics/what-is-a-data-lake/, Amazon Web Services, Inc., Retrieved on Jan. 15, 2020.

* cited by examiner

VIEW TABLES FRAMEWORK

CROSS-REFERENCE TO RELATED APPLICATION

Co-pending U.S. patent application Ser. No. 16/773,138, entitled "CONDENSER FRAMEWORK," filed on a date even herewith is hereby incorporated by reference herein in its entirety. Co-pending U.S. patent application Ser. No. 16/773,165, entitled "SNAPSHOT LOAD FRAMEWORK," filed on a date even herewith is hereby incorporated by reference herein in its entirety.

FIELD OF TECHNOLOGY

This application describes apparatus and methods for big data processing in a data lake storing information in native format.

BACKGROUND

In the digital world, organizations utilize data to perform fundamental daily functions. Examples of organizations include grocery stores, universities and financial institutions. Each organization may utilize and store different categories of data. For example, grocery stores may utilize and store point-of-sale ("POS") data, customer data, available food stock data and employee data. Universities may utilize and store student data, book data, class schedule data and employee schedule data. Financial Institutions may utilize and store customer data, bank account data, credit bureau data, card data, mortgage data, vehicle loan data and employee data.

Many times, because there may be different types of data stored within one organization, an organization's data may be stored in multiple source systems, also known as systems of record. Each source system may operate as a mini entity. Each source system may include its own dedicated database and computing system. In an example, an organization may include multiple departments; each department within the multi-department organization may maintain its own database.

However, there may be disadvantages associated with hosting multiple mini entities within an organization. One disadvantage may be data duplicity. Because each mini entity includes its own database and computing system, there may be many records, such as customer records, that are included in more than one mini entity. There may be numerous problems associated with duplicate records. Firstly, duplicate records may waste resources. Secondly, duplicate records may increase the risk of data discrepancies. An example of a data discrepancy may be that a first department may include a middle initial of a person's name and a second department may not include the middle initial of the person's name.

Therefore, it may be desirable to combine the data from all of the source systems to an amalgamated data lake. An amalgamated data lake may be a system or repository of data. The data stored in a data lake may be stored in a natural or raw format, such as blobs or files.

A data lake may be a single storage location for all enterprise data. The enterprise data may include raw copies of source system data. The enterprise data may also include transformed data used for reporting, visualization, advanced analytics and machine learning.

A data lake may also store structured data, semi-structured data and binary data. Structured data may include row and column data retrieved from relational databases. Semi-structured data may include comma separated value ("CSV") files, log files, extensible markup language ("XML") files and java script object notation ("JSON") files. Binary data may include image files, audio files and audio-visual files.

However, there may be limited functionality within the data lake when compared to the capabilities of the source systems. Therefore, it may be further desirable to create frameworks that offer certain data manipulation capabilities that have been previously unavailable within the data lake.

A framework may be a platform for developing, hosting and executing software applications. A framework may include predefined classes and functions that can be used to process input, manage hardware devices and interface with system software. A framework may include one or more application programming interfaces ("APIs"). A framework may be used to execute a specific set of functions.

It may be yet further desirable to enable each department to access their data within the data lake.

It may be still further desirable to provide a system to migrate the data from the source systems to the data lake.

SUMMARY

A method for migrating data from disparate source systems to an amalgamated data lake is provided. The amalgamated data lake may be a Hadoop™ data lake. The method may include receiving data files at a first location within a data repository. The data repository may be a card data repository or any other suitable data repository. The data files may include unstructured data.

The method may include tabulating a copy of the data files into structured tables. The tabulating may be executed within the data repository.

The method may include transferring the structured tables from a first location within the data repository to a database within the data repository. The database may be Teradata™ or any other suitable database.

The method may include transferring the data files that include the unstructured data from the first location within the data repository to an edge node within the data lake.

The method may include transferring the structured tables from the database within the data repository to a stage table within the data lake. It should be appreciated that the data lake receives both structured data and unstructured data from the data repository. The structured data and unstructured data may be received from one, two or more locations within the data repository.

The method may include tabulating the data files that include the unstructured data into structured tables within the data lake. The tabulating may be executed at the edge node.

The method may also include transferring the structured data from the edge node to the stage table within the data lake. The method may include checking for, and removing, duplicate data records at the stage table.

The method may also include packaging the structured data at the stage table into a permanent load insert statement. The permanent load insert statement may be a data warehouse software project script built on the data lake. Such a script may be a Hibernate Query Language script, also referred to herein as an .hql script. The script may be operable to append data to a permanent table within the data lake.

The method may include inserting the permanent load insert statement into a permanent table within the data lake.

The method may include appending the structured data included in the permanent load insert statement onto the permanent table.

The method may include using a viewing module within the data lake to generate a view of the structured data included in the permanent table. The viewing module may point to the permanent table. The viewing module may include a current time stamp. The current time stamp may include a current day, current month and/or current year. The viewing module may generate a view of a specific set of structured data. The specific set of structured data may include structured data that includes a time stamp comprising a month and year that is identical to the month and year of the current time stamp. The specific set of structured data may be formed into a table.

The method may include generating an email upon a successful generation of the view of the structured data.

A framework for viewing data within an amalgamated data lake is also provided. The framework may include a viewing module. The viewing module may provide automatic logic and executable generation to enable a user to generate multiple views of tables in the data lake. The tables may include structured data.

The multiple views may include current views. The current views may include records of a current month.

The current views may also include monthly views. The monthly views may include records of a predetermined month and year.

The multiple views may also include secured schema views. The secured schema views may include records relating to secured schemas. The secured schemas may include data located in, or having one or more relationships with, secure environments.

The multiple views may also include unsecured schema views. The unsecured schema views may include records relating to unsecured schemas. The unsecured schemas may include data located in, or having one or more relationships with, unsecure environments.

Upon receipt of a request from an identified user to generate a predetermined view, the framework, or a receipt module within the framework, may generate the predetermined view. The predetermined view may be one or more of the multiple views.

Upon generation of the predetermined view, the framework, or a transmission module within the framework, may transmit a successful email notification to the identified user. A successful email notification may include the predetermined view and/or one or more tables that have been generated within the predetermined view.

The framework may also include a query tool. The query tool may enable a user to analyze and query tables within the data lake.

A system for migrating data from disparate source systems to an amalgamated data lake may also be provided.

The system may include a receiver. The receiver may be located at a data repository. The receiver may be operable to receive a plurality of data files. The data files may include unstructured data.

The system may include a transmitter. The transmitter may be located at the data repository. The transmitter may be operable to transmit a copy of the plurality of files to an edge node. The edge node may be within a data lake. The data lake may be external to the data repository.

The system may include a tabulator. The tabulator may be located at the data repository. The tabulator may be operable to tabulate a copy of the plurality of data files.

The transmitter, located at the data repository may be further operable to transmit the tabulated copy of the plurality of data files to a database within the data repository.

The system may include a second transmitter. The second transmitter may be located at the database within the data repository. The second transmitter may be operable to transmit the tabulated copy of the plurality of data files to a stage table within the data lake.

The system may also include a third transmitter. The third transmitter may be located at the edge node within the data lake. The third transmitter may be operable to transmit the copy of the plurality of files from the edge node to the stage table.

The system may also include a processor. The processor may be located at, or operate on, the stage table. The processor may be operable to identify unstructured data within the stage table. The processor may be operable to tabulate the unstructured data within the stage table. The processor may be operable to identify and remove duplicate data from the stage table.

The system may also include a fourth transmitter. The fourth transmitter may be located at the stage table. The fourth transmitter may be operable to transmit unique, tabulated data from the stage table to a permanent table. The unique, tabulated data may be packaged into a permanent load insert statement. The packaging may be executed prior to the unique, tabulated data being transmitted to the permanent table.

The permanent load insert statement may be a data warehouse software project script built on the data lake, such an an .hql script. The script may be operable to append the unique, tabulated data to the permanent table within the data lake.

The system may also include a viewing module. The viewing module may be within the data lake. The viewing module may point to the permanent table. The viewing module may be operable to generate a view of the tabulated data included in the permanent table.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DISCLOSURE

Figure 1:
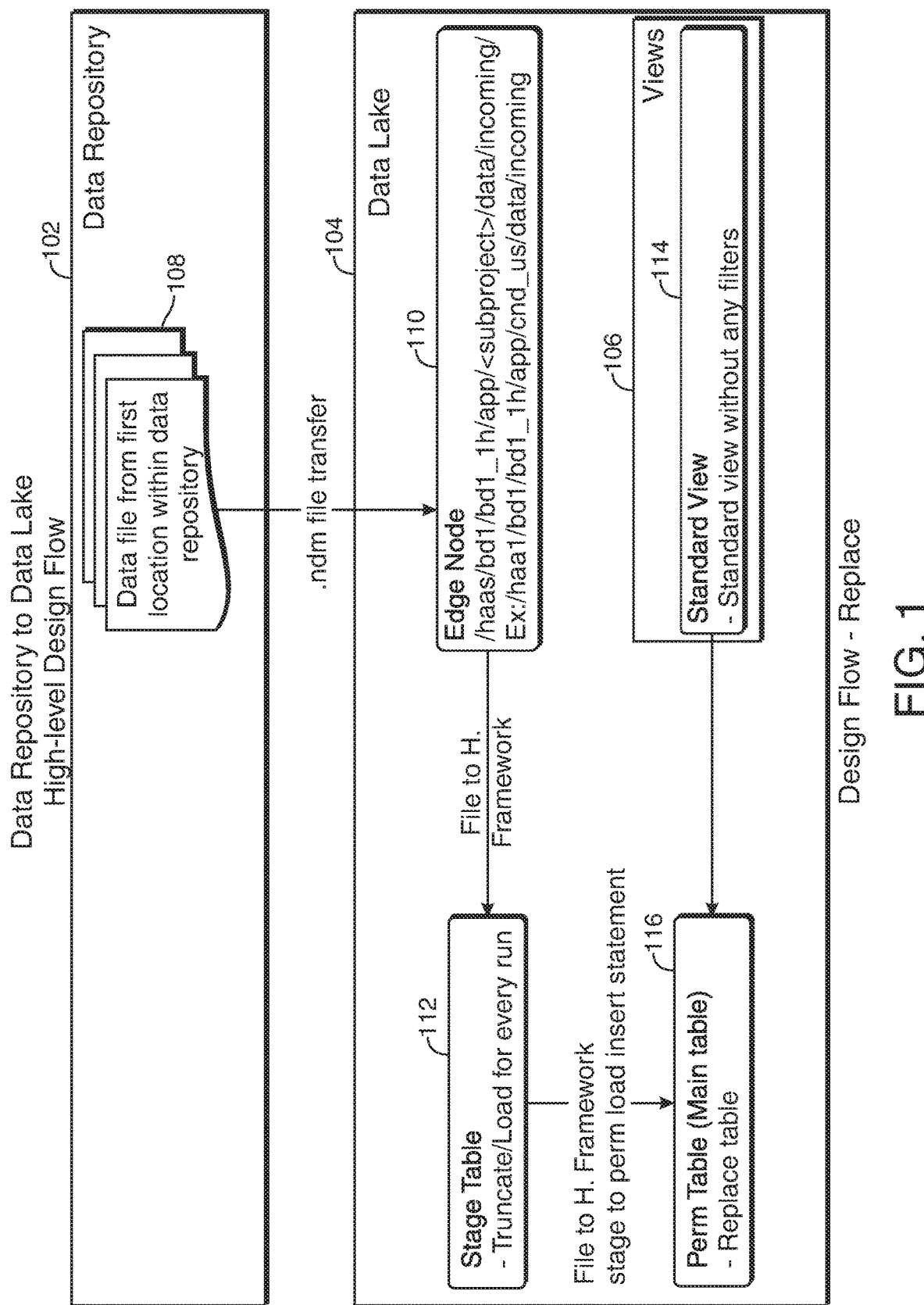
FIG. 1 shows an illustrative system in accordance with principles of the disclosure.

A system for migrating data from disparate source systems to an amalgamated data lake is provided. Such a system may provide, within the data lake, a 360-degree view of the data that had previously been housed in the disparate source systems. The 360-degree view may be understood, for the purposes of this application, to mean a comprehensive, single-location, homogeneous view of data from multiple source systems.

Examples of the disparate source systems may include a customer credit bureau refresh system, a consumer vehicle lending system, a card information system, a consumer loans risk operation system, a global wealth and investment management data provisioning point system and a mortgage data exchange operational data store.

A customer credit bureau refresh system may be a system that includes data relating to refresh information for a customer's credit. The refresh system may include data to be transmitted to credit bureaus. The refresh system may also include data received from credit bureaus.

The refresh system may also query credit bureaus for soft credit inquiries. Soft credit inquiries may identify recently incurred or undisclosed responsibilities. Soft credit inquiries may preferably not affect a customer or inquirer's credit score.

A consumer vehicle lending system may be a system that includes data relating to vehicle financing. The lending system may include data relating to lease buyouts, new car financing, used car financing and any other suitable vehicle financing data.

A card information system may be a system that includes data relating to card information. The card information system may include data relating to debit cards, credit cards, automated teller machine ("ATM") cards, cash cards, gift cards or any other suitable cards. The card information system may include data relating to card owners, card users, card transaction history or any other suitable card data.

A consumer loans risk operations system may be a system that includes data relating to consumer loans. The system may also calculate and store risk metrics relating to consumer loans. Such loans may include short term loans, long term loans, home improvement loans or any other suitable consumer loans. The risk operations system may include algorithms for determining risk at loan closings. The risk operations system may also include algorithms for determining risk periodically throughout the life of the loan.

A global wealth and investment management data provisioning point system may be a system that includes data relating to capital management. Such a system may include investment data, stock data and any other suitable data.

A mortgage data exchange operational data store may be a system that includes data relating to mortgages. Such a system may include mortgage data, property data, property tax data, escrow data and any other suitable data.

The migration and deployment system may provide a system to migrate the data from the source systems, such as those discussed above, to an amalgamated data lake. Such a migration may include transferring data between each source system and the data lake.

There may be technical problems with the standard data lake functionalities. Specifically, a data lake may be optimized for storing data, not displaying data. This may be because a data lake is a single location for huge amounts of diverse data. The data lake may be lacking the capabilities, or be optimized to, present data in easily consumable views that enable a user to appropriately identify, select and manipulate the data.

As such, there may be certain functionalities that are available in each of the above-mentioned source systems but are not available within the amalgamated data lake. Therefore, various add-on functionalities may be made available within the system. These add-ons may be implemented within the data lake to perform the functionalities that have previously not been available. These functionalities may include generating views for viewing the data included in the data lake, generating views for viewing historical snapshots of the data included in the data lake and generating condensed views of the data included in the data lake.

Each of these functionalities may be embodied in a framework. The frameworks may include a view creation framework, a snapshot load framework and a condenser framework.

A view creation framework may be used by the end user to view and query the data included in the data lake. The view creation framework may produce different views of the data included in the data lake's data tables. The different views may enable entity users to view and manipulate the data.

The view creation framework may perform numerous executables. The view creation framework may automate the logic needed to generate the views in order to be compatible with a environment that is special for storing data and running applications on clusters of commodity hardware. Such an environment may provide large amounts of storage for any data type. Such an environment may also provide enormous processing power and the ability to handle virtually limitless concurrent tasks or jobs. Such an environment may be a Hadoop™ environment, which may also be referred to herein as the Hadoop™ framework. The Hadoop™ environment may be an open-source software framework for storing data and running applications on clusters of commodity hardware. The Hadoop™ environment provides massive storage for any data type, as well as enormous processing power. Hadoop™ also provides the ability to handle virtually limitless concurrent tasks or jobs.

Previously, in order to generate multiple views, multiple developers were used. Multiple developers were previously used because a separate view application was generated for each source system. Therefore, each time a view application was created, a developer was used to create the custom application from the initial stages. It should be appreciated that more than one developer working on the same project may produce a greater risk of errors. Therefore, automating the logic and the views within the data lake may reduce the risk of errors. Additionally, once a view is generated, it can be used for multiple data groups within the data lake.

In addition, the automated logic and views may be replicated and reusable. The replicated and/or reusable automated logic and views may be utilized for various different types of data received from various source systems.

The view creation framework may include creating current and monthly views. Current views may be views of the data included in the data lake. Current views may point to current data, so the current view may display all of the current month's records. Monthly views may point to a specific point in time. Monthly views display all of the records for the requested month.

The view creation framework may also create views on tables that have been replaced with new data. The view creation framework may also create standard views on upsert permanent tables using a configuration file. Upsert tables may be tables that are condensed so that only the latest record in the table is visible.

The view creation framework may also create views on secured and non-secured schemas. The schemas may be based on metadata.

The view creation framework may also automate standard view creation with ranking and joins for upsert tables. The view creation framework may also add a to_date function for source date columns. The to_date function may mimic a to_date function included in the one of the source systems. The view creation framework may format the data as per end user needs.

The view creation framework may also provide a bridge between the disparate source systems and the amalgamated data lake. The view creation framework enables users to view data from previously disparate systems in one location or view. Additionally, the view that point to the data lake may replicate views that pointed to each source system. As such, a user may be familiar with the views and re-training of users may be unnecessary.

Upon successful generation of the scheduled tables, the view creation framework may transmit an email alert. The email alert may include the list of tables that have been generated and are available for viewing. The generated tables may be made available for viewing through multiple user interfaces. The user interfaces may include general user interfaces, group entity user interfaces, entity specific user interfaces or department specific user interfaces. The user interfaces may be customizable to enable a user to customize the user interface. The generated tables may be queried by a query tool. Such a query tool may include Hue™. Hue™ may be a user interface, or SQL assistant, for analyzing and querying data within a Hadoop™ data lake. Hue™ may make self-service data querying more easily accessible to organizations.

The snapshot load framework may provide the ability to users to view historic tables. The data may be archived to history tables at the end of every month. Users can access these records in order to analyze old records or transactions. The snapshot load framework may automate the process of loading data, such as daily transactions, into a history table from the main table every month.

Upon successful generation of the scheduled history tables, the snapshot load framework may transmit an email alert. The email alert may include the list of tables that have been generated and are available for viewing. The generated tables may be made available for viewing through multiple user interfaces. The user interfaces may include general user interfaces, group entity user interfaces, entity specific user interfaces or department specific user interfaces. The user interfaces may be customizable to enable a user to customize the user interface.

The condenser framework may include a process for condensing tables. Tables within the data lake may include numerous transactions.

New transactions may be appended to the tables daily. However, many times an end user desires to view only the latest record in a table. Therefore, the condenser framework performs an upsert process. The upsert process may truncate the old records and maintain only the latest record in a table.

Upon successful completion of the condenser process, the condenser framework may transmit an email alert. The email alert may include the condensed tables that have been generated and are available for viewing. The condensed tables may be made available for viewing through multiple user interfaces. The user interfaces may include general user interfaces, group entity user interfaces, entity specific user interfaces or department specific user interfaces. The user interfaces may be customizable to enable a user to customize the user interface. The generated tables may be queried by a query tool. Such a query tool may include Hue™. Hue™ may be a user interface for analyzing and querying data within a Hadoop™ data lake.

It should be appreciated that the condenser process also improves performance and storage space of the condensed table.

It should also be appreciated that the user experience when accessing the data lake may be similar to the user experience when accessing the source systems. This may enable a seamless migration from the source systems to the data lake.

The following is a list of advantages associated with a data lake and the above-described frameworks.

The advantages may include reducing the manual effort. Manually producing the views may be time-intensive. This system automates that process and reduces bandwidth. Specifically, because Hadoop™ is a low-level framework and focuses on storing data, there may be limited resources made available for producing user-friendly views. Therefore, the above-described frameworks in addition to Hadoop may provide a user with the Hadoop advantages as well as automated user-friendly views.

The advantages may also include simplifying the user interface and process.

The advantages may also include the reusability of each process that is generated within the data lake. Therefore, once a first source system is migrated to the data lake, the process may be replicated in multiple source systems.

The advantages may also include a reduction in the amount of data. Therefore, the system may save resources, such as memory and processing power.

The advantages may also include improving performance of jobs and end user queries.

The advantages may also include data simplification. Data simplification may be specifically useful for audit and built-in enforcement of standards and policies.

The advantages may also include customizing the data output for end user needs.

FIG. 1 shows an illustrative diagram. The illustrative diagram shows a high-level design flow of a replace command.

Data from source system 102 may be transferred to data lake 104. Data lake 104 may be a Hadoop™ data lake. A Hadoop™ data lake may utilize specialized software to generate massive amounts of computing power from multiple average capability computers. The specialized software may distribute computing tasks across multiple nodes. The nodes may be linked. The nodes may include average computing capabilities.

This method of distributed processing may be efficient. One reason this method may be efficient may be because in the event of a failure on a node, the data lake may remain operational.

Source system 102 may be a card information system. Data files 108 may be transferred from source system 102 to edge node 110. Edge node 110 may be within data lake 104. It should be appreciated that, in some embodiments, edge node 110 may receive all of the files from source system 102.

The data transfer between source system 102 and data lake 104 may be a network data mover ("NDM") data transfer. NDM may be a software product for transferring files between mainframe computers and midrange computers.

Edge node 110 may transfer files to stage table 112, within data lake 104. The transfer between edge node 110 and stage table 112 may be described as file to H. Framework. File to H. Framework may be understood to mean processing a file within the data lake in order to store the file within the data lake. An H. Framework may be a Hadoop™ framework, data lake or other suitable framework. Stage table 112 may be the first location at which unstructured and/or unorganized data received from predetermined relational database management system is structured is structured into tables. The predetermined relational database management system may be configured to run on multiple virtual storage locations. The predetermined relational database management system may be DB2™. DB2™ may include structured and/or unstructured data files.

In some embodiments, the files transmitted to stage table 112 may be metadata files. The metadata files may include data about the data files received from source system 102. An example of metadata included in the metadata files may include file name, file size, file origin or any other suitable metadata. In certain embodiments, the transmitted data may include data included in data files. Such data may be a portion, or the entirety of the data included in the data files.

Stage table 112 may receive metadata and/or data from edge node 110 included in the data lake. Stage table 112 may be the first step in which data from data files are structured within a table. Stage table 112 may truncate and/or load the metadata for every run. Upon solidifications of the data within stage table 112, the stage table may generate a permanent load insert statement. The permanent load insert statement may combine multiple solidified data elements that have been received at stage table 112. The permanent load insert statement may be one or more .hql files.

The permanent load insert statement may be transmitted to permanent table or main table 116. Permanent table or main table 116 may receive insert statements from the stage table. Permanent table or main table 116 may be replaced with the updates received from stage table 112. Permanent table or main table 116 may represent a permanent record of the current data included in each edge node.

The view creation framework may include a view process to enable users to view the data included in permanent table or main table 116. The views may be shown at 106. The views shown may include a standard view 114. Views 106 may point to permanent table 116. Therefore, views 106 may display the data included in permanent table 116. Standard view 114 may include a view of the data without any filters or queries.

Some views may enable filters and/or queries. The filters and/or queries may narrow the data that is viewed. Different views may give a user the ability to view different aspects of the data.

Figure 2:
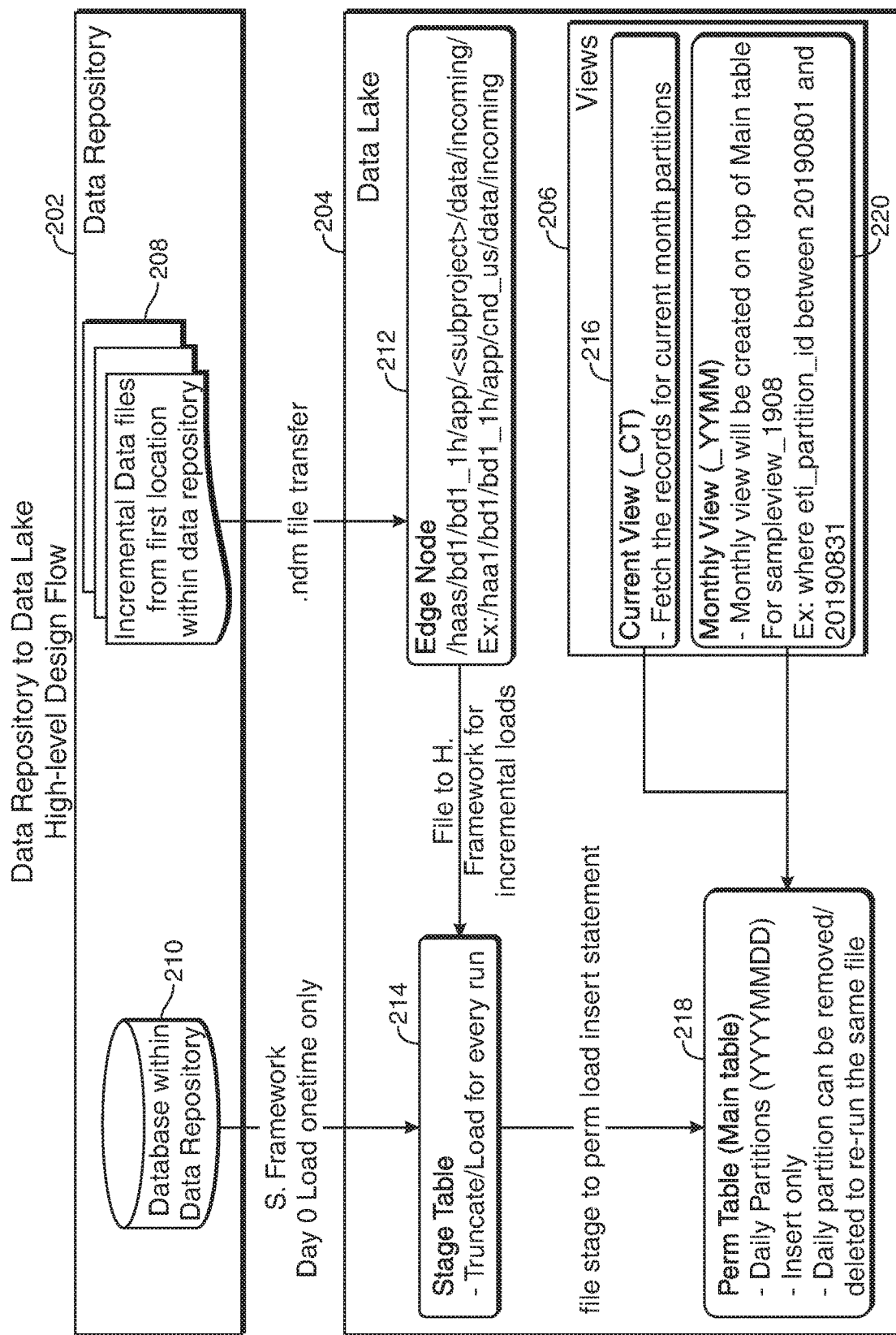
FIG. 2 shows an illustrative system in accordance with principles of the disclosure.

FIG. 2 shows another illustrative diagram. The illustrative diagram shows a high-level design flow. The high-level design flow includes source system, shown at 202 and amalgamated data lake, shown at 204.

Source system 202 may include data. The raw data received at source system 202 may be shown at 208 as incremental data files from DB2. Prior to utilizing the data lake, a relational database management system, shown at 210, may be used to store structured data that has been culled from data files 210. Such a relational database management system may be a Teradata™ database. Therefore, database 210, includes data that has been structured within tables.

Once incremental data files from DB2 208 are structured and positioned within tables in Teradata database 210, the incremental data files from DB2 may be archived.

Upon the initiation of data lake 204, incremental data files from DB2 may be transferred directly to edge node 212. However, because Teradata 210 also includes structured tables of archived data files, the tabulated data from Teradata 210 may also be transferred to stage table 214.

In addition, during the migration process, the data files from DB2 may continue to be transferred to Teradata database 210. This may result in duplicate data within stage table 214. Stage table 214 may include data duplicate removal processes for removing the duplicate data. Additionally, data files received from DB2 may also include duplicate data. As such, this duplicate data may be easily removed once the data files are transferred into structured data files.

Edge node 212 may transfer data or metadata relating to incremental data files to stage table 214. Stage table 214 may also receive tabulated data from Teradata database 210, as described above. It should be appreciated that the data transfer between Teradata database 210 and stage table 214 may utilize a command-line interface application for transferring data between relational databases and environments, such as Hadoop™. Such an interface may be referred to as an S. Framework. Such an interface may be a Sqoop™ framework. The transfer between Teradata database 210 and stage table 214 may also load one time only at Day 0. The Day 0 load may be executed once the migration from the data repository system is archived. As such, upon the day 0 load data from the DB2 may be imported directly into edge node 212 instead of the DB2.

Stage table 214 may truncate and/or load for every run. Stage table 214 may tabulate unstructured data received from edge node 212. Stage table 214 may also remove duplicates. Duplicates may be the same data included in both tabulated data received from Teradata 210 and unstructured data received from edge node 212. Duplicates may also include multiple data records, each of which correspond to the same data record, however, include a different time stamp. As such, the data record with the most recent time stamp may be maintained, and all other data records—i.e., data records with historic time stamps—may be removed during the duplicate removal.

Stage table 214 may include the most recent data records to be appended to the permanent table. Stage table 214 may combine the structured data into a permanent load insert statement. As such, the most recent data records may be formulated into a permanent load insert statement. The permanent load insert statement may be in the formation of an .hql file. The permanent load insert statement may be inserted into permanent table (main table), shown at 218. As such, the records included in the permanent load insert statement may be appended to the main table.

Permanent table (main table) 218 may include daily partitions. The daily partition may be removed and/or deleted to rerun the same file. Permanent table 218 may receive insert statements.

Views 206 may enable a user to view the contents of the permanent table 218. Views 206 may point to permanent table 218. Views 206 may retrieve data from permanent table 218 for end user viewing. Therefore, the data included in permanent table 218 may be visible by an end user.

Views 206 may include current view 216 and monthly view 220. Current view 216 may point the current month.

Because each month may be partitioned from the other months, the current view pointer may point to the current month.

Monthly view 220 may be operable to receive parameters. The parameters may be month and year parameters. The parameters may be received in a year, year, month, month (YYMM) format. Monthly view 220 may receive the month and year parameters. Monthly view 220 may access permanent table 218 to retrieve the records included in the partition of the month that corresponds to the received parameters. Monthly view 220 may display the retrieved records to the end user.

Figure 3A:
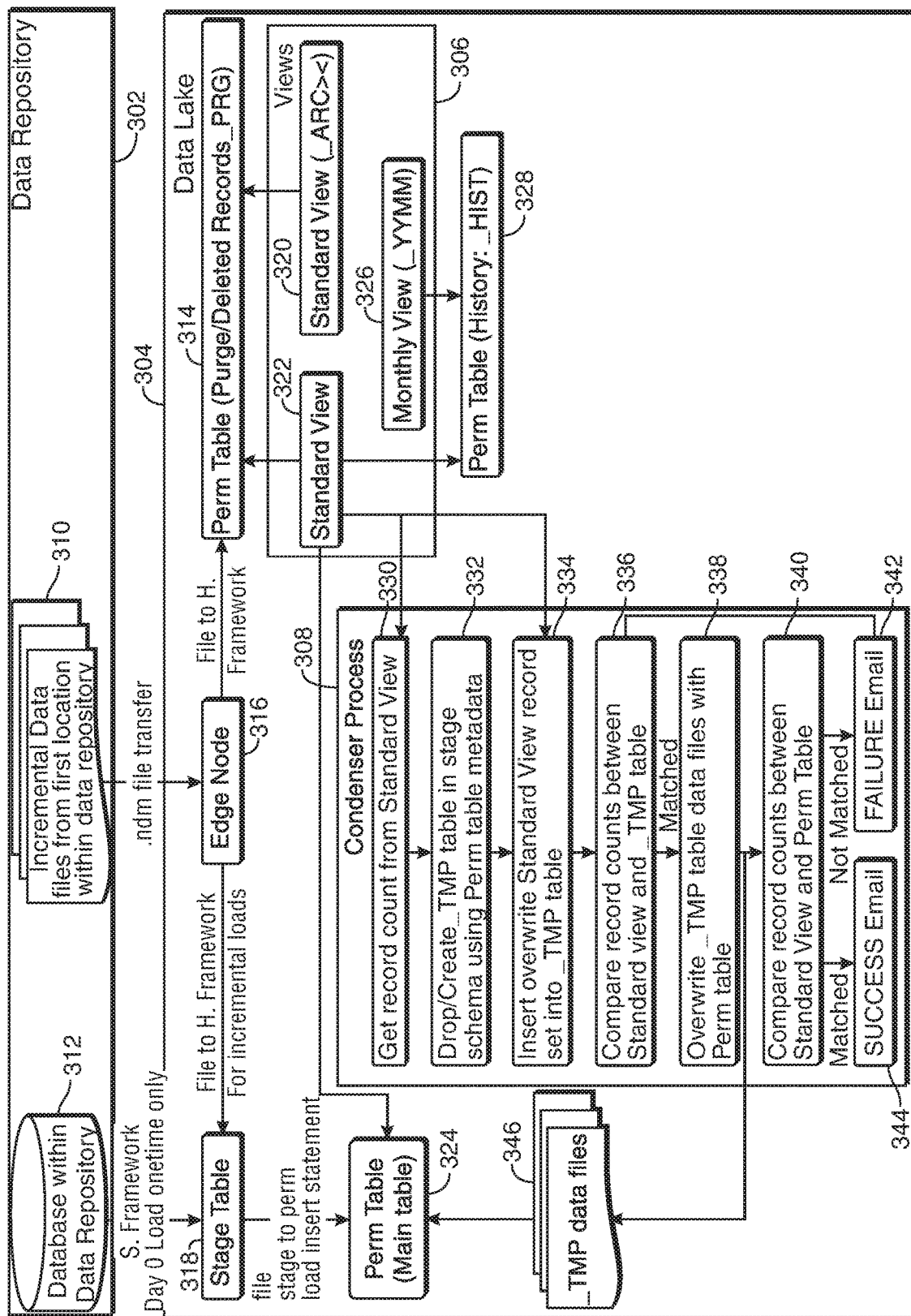
FIG. 3A shows an illustrative system in accordance with principles of the disclosure.
Figure 3B:
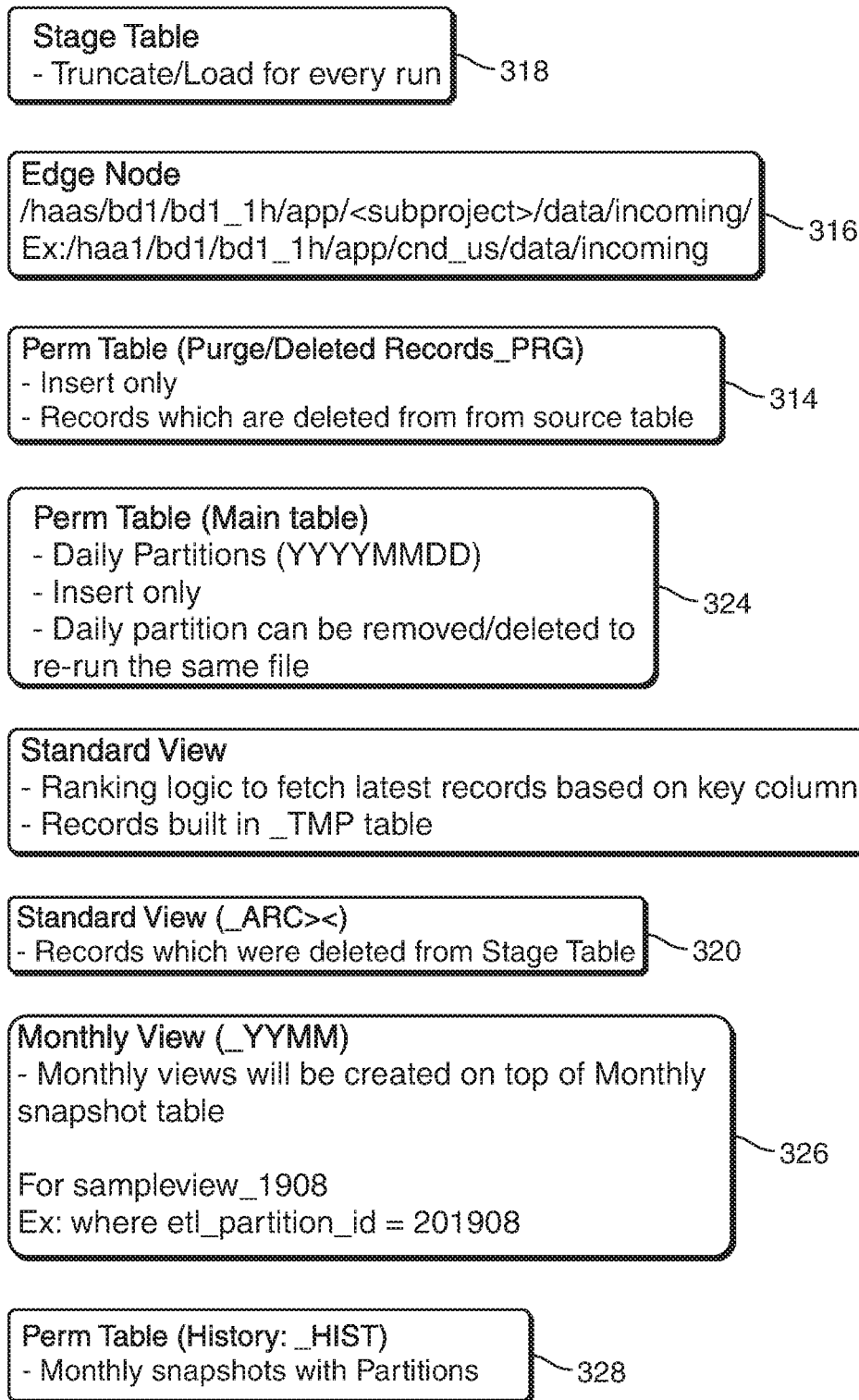
FIG. 3B shows an illustrative system in accordance with principles of the disclosure.

FIG. 3A and FIG. 3B show an illustrative diagram. FIG. 3A shows the flow between components. FIG. 3B includes details on some of the components included in the FIG. 3A.

As discussed above, source system 302 may transmit data to data lake 304. Unstructured data may be migrated from incremental data files from DB2, as shown at 310, to edge node 316. The data transfer between data files 310 and edge node 316 may be an NDM file transfer.

Tabulated data may also be migrated from Teradata database 312 directly to stage table 318. The data transfer between Teradata database 312 and stage table 318 may utilize the Sqoop™ framework. The data transfer between Teradata database 312 and stage table 318 may be a day zero one time load.

The unstructured data received at edge node 316 may include various categories of labeled data. One category of labeled data may include data that is in-use. Another category of labeled data may include data that was marked within source system 302 to be deleted.

The in-use data may be transferred from edge node 316 to stage table 318. The in-use data may be structured at stage table 318. After structuring, in-use data may be formed into load insert statements. The load insert statements may be .hql files. The load insert statements may be loaded into permanent table (main table) 324.

The data that was marked to be deleted may be transferred from edge node 316 to permanent table (purged/deleted records) 314. Permanent table (purged/deleted records) 314 may include all of the purged and/or deleted records.

Permanent table (history) 328 may include historical data. Each month, the standard view of the month may be processed and loaded to permanent table (history) 328. Permanent table (history) 328 may maintain a historical log of the records.

View 306 may include a plurality of views. Standard view 322 may point to permanent table (main table) 324, permanent table (purged/deleted records) 314 and permanent table (history) 312. Therefore, standard view 324 may display substantially all of the available data within data lake 304.

Standard view 320 may point to permanent table (purged/deleted records) 314. Therefore, standard view 320 may display the purged and/or deleted records.

Monthly view 326 may point to permanent table (history) 312. Therefore, monthly view 326 may display the historical records of a particular historical month. The particular historical month to be displayed may be received from a user. The month may be received from a user in the year, year, month, month (YYMM) format.

Condenser process 308 may be a process used to truncate tables in order to enable an end user to view only the latest record. Condenser process may also be known as an upsert process.

Condenser process may retrieve a record count from standard view 322, as shown at 330. Condenser process may drop and/or create a temporary table (_TMP table) in stage schema using permanent table metadata, as shown at 332. Condenser process may insert overwrite standard view record set into the temporary table, as shown at 334.

Condenser process may compare the record counts between the standard view and the temporary table, as shown at 336. If the record counts between the standard view and the temporary table do not match, a failure email may be transmitted, as shown at 342.

If the record counts between the standard view and the temporary table match, the condenser process may overwrite the temporary table with data files from the permanent table, as shown at 338. Temporary data files 346 may retrieve the files for the rewrite from permanent table (main table) 324.

After the overwriting, the condenser process compares the record counts between the standard view and the permanent table, as shown at 340. If the record counts between the standard view the permanent table match, the condenser process generates a success email, as shown at 344. If the record counts between the standard view and the permanent table do not match, the condenser process generates a failure email, as shown at 342.

The record count, within the condenser process, may be checked two times to ensure the appropriate record count. It is important that the count is correct because the upsert function makes only the top record visible. Therefore, if there is an incorrect count, the incorrect record will be the top record, and as such, the incorrect record will be visible.

Figure 4:
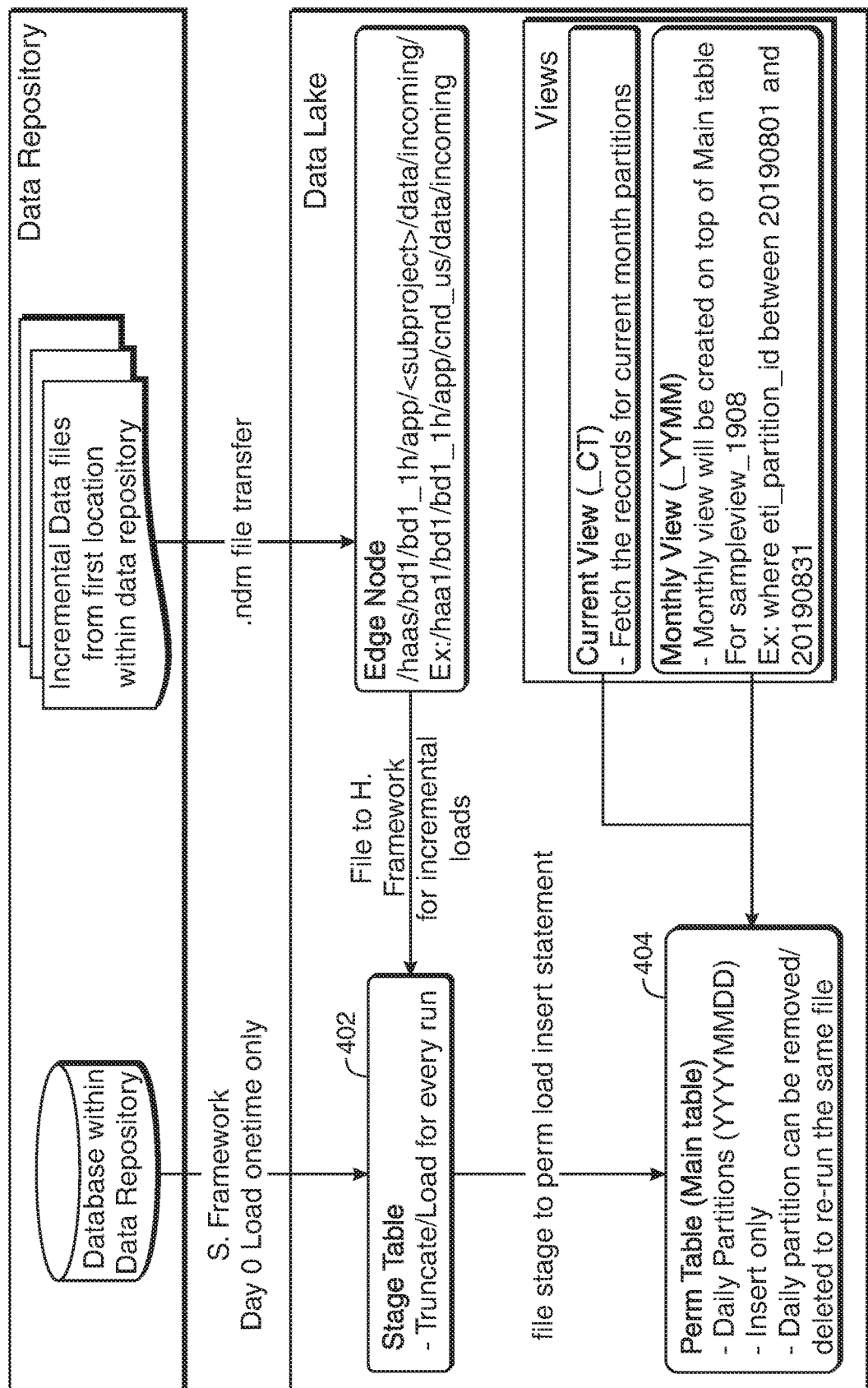
FIG. 4 shows an illustrative system in accordance with principles of the disclosure.

FIG. 4 shows an illustrative diagram. The illustrative diagram may correspond to a design flow of an append command. In the append command, the data being transmitted from stage table 402 to permanent table 404 may be appended to the data already in permanent table 404. It should be appreciated that this is different from the replace command, where the data in the stage table replaces the contents of the permanent table.

Figure 5:
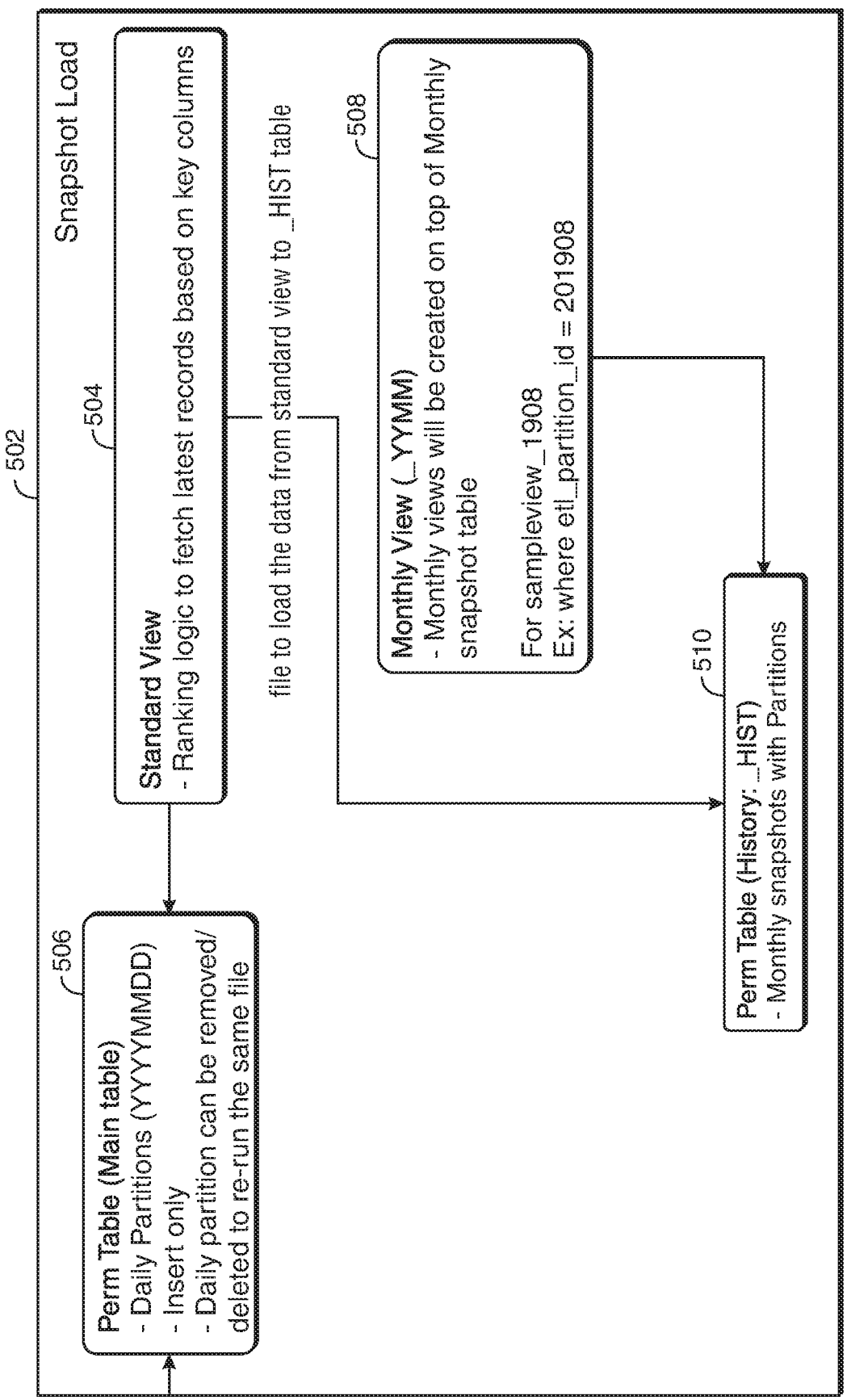
FIG. 5 shows an illustrative system in accordance with principles of the disclosure.

FIG. 5 shows an illustrative diagram. The illustrative diagram shows snapshot load framework 502. Snapshot load framework 502 includes standard view 504. Standard view 504 points to, and joins, permanent table (main table) 606 and permanent table (history table) 510. Standard view 504 may display current data and historical data to an end user.

Monthly view 508 point to permanent table (history table) 510. Monthly view 508 may display historical data based on a parameter received from an end user.

Figure 6:
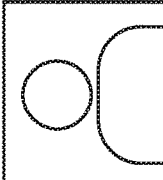
FIG. 6 shows illustrative output of an illustrative system in accordance with principles of the disclosure.

FIG. 6 shows illustrative email diagram 602. Email diagram 602 may demonstrate a successful completion of a view tables process. Email diagram 602 may be transmitted to an end user.

Email diagram 602 may include a date and time, shown at 604. Date and time 604 may be the date and time of the transmission of the email.

Email diagram 602 may also include an email address or email address alias, shown at 606. Email address or email address alias 606 may be the email address or email address alias from which the email was transmitted.

Email diagram 602 may also include a subject line, shown at 608. Subject line 608 may include details relating to the successful view tables process. Subject line 608 demonstrates that folder XX view tables have been created successfully.

Email diagram 602 may also include an email recipient line, shown at 610. Email recipient line 610 may include a recipients or recipient groups to which email 602 was transmitted. The recipients of email 602 include XXX support team and XXX development team.

Email diagram 602 may also include the view tables that have been created, as shown at 612. Email diagram 602 shows that folder XX view tables including tables 1900-1908 have been created.

Figure 7:
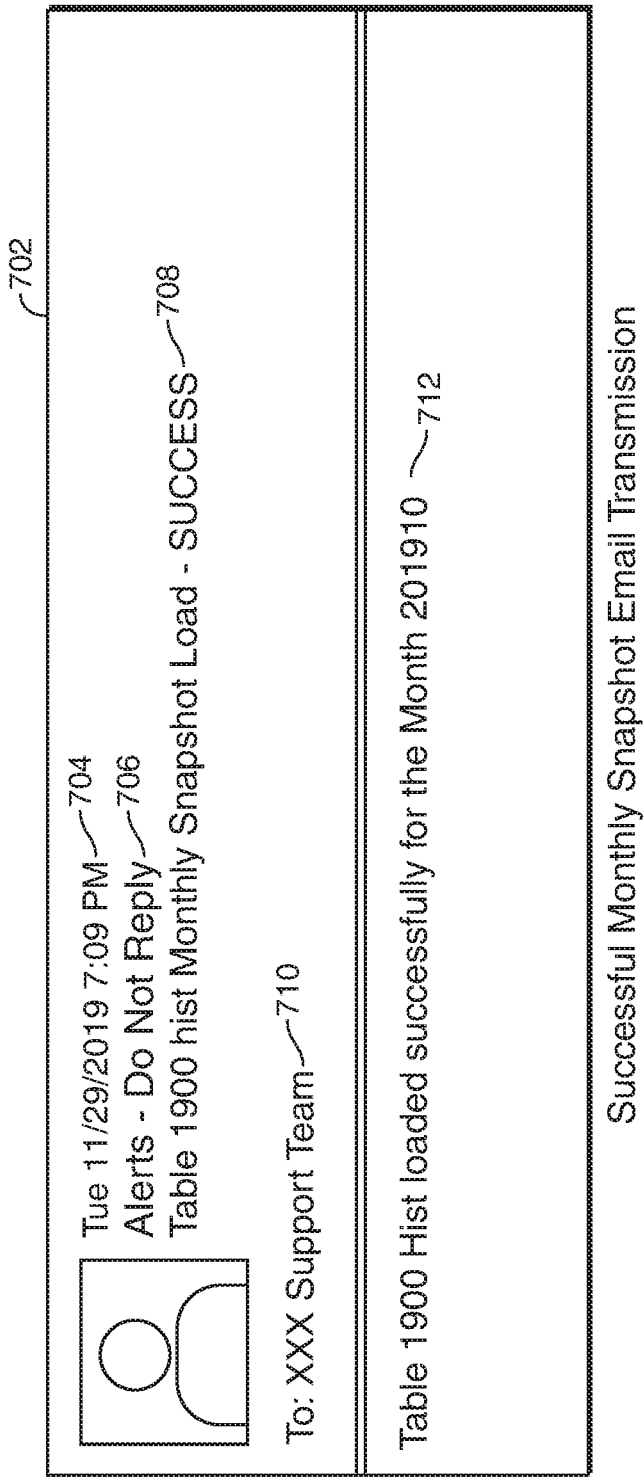
FIG. 7 shows illustrative output of an illustrative system in accordance with principles of the disclosure.

FIG. 7 shows illustrative email diagram 702. Email diagram 702 may demonstrate a successful completion of a monthly snapshot email transmission. Email diagram 702 may be transmitted to an end user.

Email diagram 702 may include a date and time, shown at 704. Date and time 704 may be the date and time of the transmission of the email.

Email diagram 702 may also include an email address or email address alias, shown at 706. Email address or email address alias 706 may be the email address or email address alias from which the email was transmitted.

Email diagram 702 may also include a subject line, shown at 708. Subject line 708 may include details relating to the monthly snapshot load process. Subject line 708 demonstrates that the historical monthly snapshot for table 1900 has been loaded and/or created successfully.

Email diagram 702 may also include an email recipient line, shown at 710. Email recipient line 710 may include a recipients or recipient groups to which email 702 was transmitted. The recipients of email 702 include XXX support team.

Email diagram 702 may also details relating to the historical snapshot loading, as shown at 712. Email diagram 702 shows that the historical monthly snapshot of table 1900 has been loaded successfully for the month of 10-2019.

Figure 8:
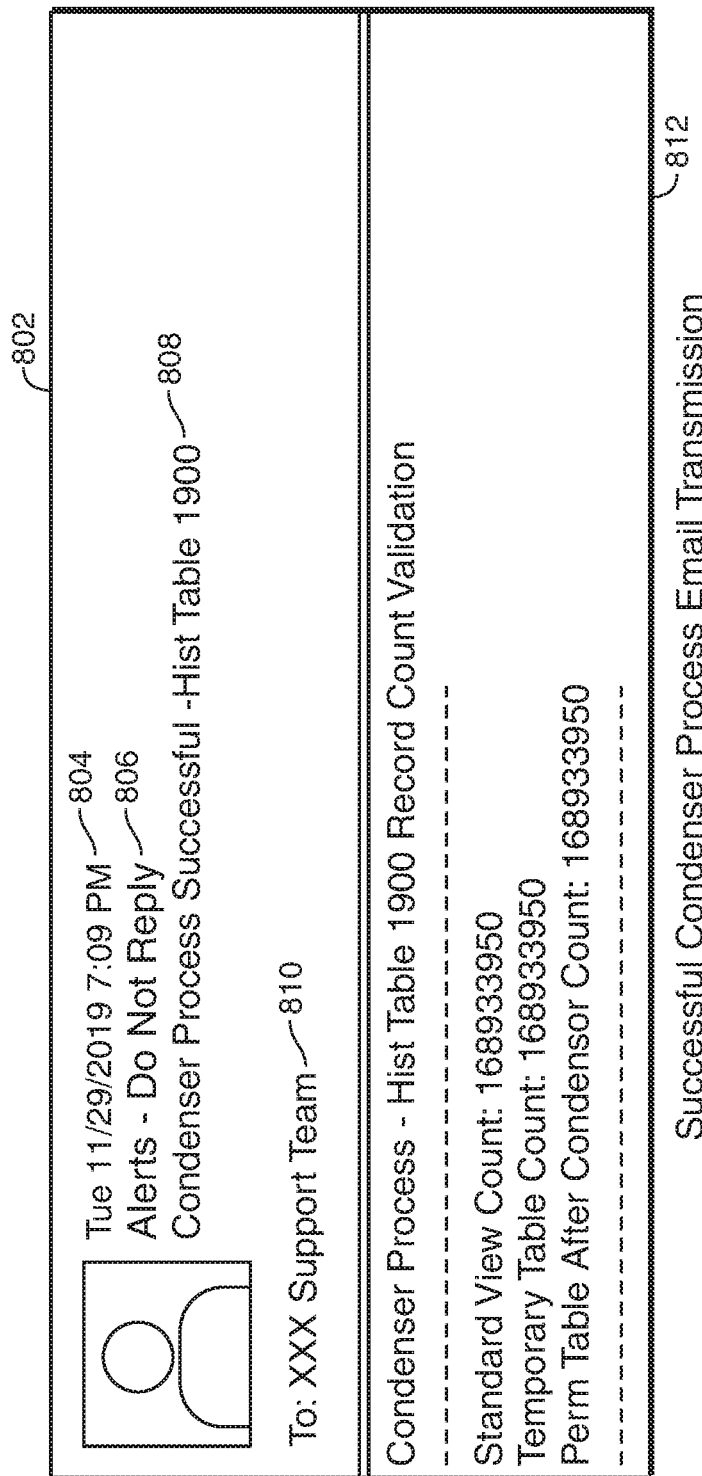
FIG. 8 shows illustrative output of an illustrative system in accordance with principles of the disclosure.

FIG. 8 shows illustrative email diagram 802. Email diagram 802 may demonstrate a successful completion of a condenser process. Email diagram 802 may be transmitted to an end user.

Email diagram 802 may include a date and time, shown at 804. Date and time 804 may be the date and time of the transmission of the email.

Email diagram 802 may also include an email address or email address alias, shown at 806. Email address or email address alias 806 may be the email address or email address alias from which the email was transmitted.

Email diagram 802 may also include a subject line, shown at 808. Subject line 808 may include details relating to the condenser process. Subject line 808 demonstrates that the condenser process for Historical table 1900 has been completed successfully.

Email diagram 802 may also include an email recipient line, shown at 810. Email recipient line 810 may include a recipients or recipient groups to which email 802 was transmitted. The recipients of email 802 include XXX support team.

Email diagram 802 may also details relating to the condenser process of historical table 1900, as shown at 812. As shown at 812, the condenser process has been successful for historical table 1900. Also, as shown at 812, a record count validation of the standard table, temporary table and the permanent table after condenser count is shown. The record count may show that the count has remained the same within the various table views.

Figure 9:
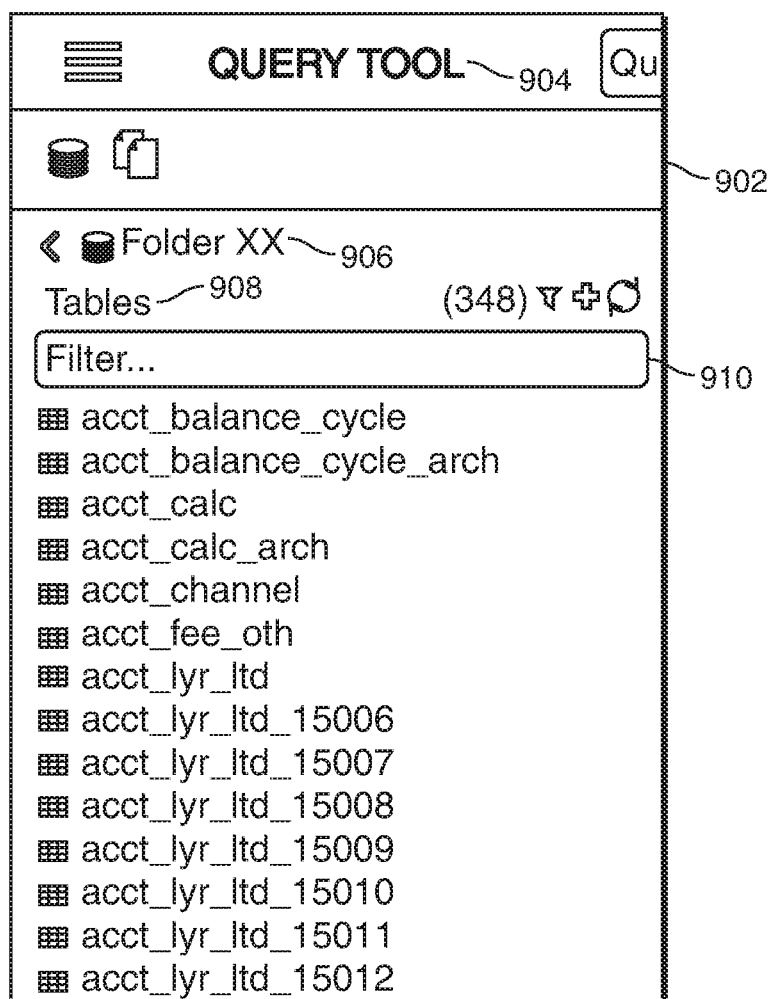
FIG. 9 shows illustrative output of an illustrative system in accordance with principles of the disclosure.

FIG. 9 shows an illustrative query tool 902. Query tool 902 may be used to query tables within the data lake. Query tool 902 may include header 904. Query tool 902 may display a specific folder to query, as shown at 906. Query tool 902 may include a list of tables included in the folder, as shown at 908. Query tool 902 may include a filter box, as shown at 910. Filter box 910 may enable a user to filter the list of tables.

Thus, apparatus and methods for a VIEW TABLES FRAMEWORK are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A method for migrating data from disparate source systems to an amalgamated data lake, the method comprising:
    receiving data files, comprising unstructured data, at a first location within a data repository;
    tabulating a copy of the data files into structured tables within the data repository;
    transferring the structured tables from a first location within the data repository to a database within the data repository;
    transferring the data files, comprising the unstructured data, from the first location within the data repository, to an edge node, said edge node being a single system within a data lake that receives files and transfers files, said data lake being a single system storage location for storage of raw enterprise data, semi-structured enterprise data, structured enterprise data and binary data;
    transferring the structured tables from the database within the data repository to a stage table, said stage table being a system within the data lake in which unstructured files are initially structured into structured tables;
    tabulating the data files, comprising the unstructured data, into structured tables at the edge node within the data lake; and
    transferring the structured data from the edge node to the stage table within the data lake.

2. The method of claim 1, further comprising, checking for, and removing, duplicate data records at the stage table.

3. The method of claim 2, further comprising, packaging the structured data at the stage table into a permanent load insert statement.

4. The method of claim 3, wherein:
    the permanent load insert statement is a data warehouse software project script built on the data lake; and
    the script is operable to append data to a permanent table within the data lake.

5. The method of claim 3, further comprising, inserting the permanent load insert statement into a permanent table within the data lake.

6. The method of claim 5, further comprising, appending, the structured data included in the permanent load insert statement, onto the permanent table.

7. The method of claim 6, further comprising, using a viewing module within the data lake, said viewing module pointing to the permanent table, to generate a view of the structured data included in the permanent table.

8. The method of claim 7, wherein the viewing module comprises a current time stamp, said current time stamp comprising a current month and year, and the viewing module generates a view of the structured data that comprises of structured data that includes a time stamp comprising a month and year that is identical to the month and year of the current time stamp.

9. The method of claim 7, further comprising, generating an email upon a successful generation of the view of the structured data.

10. A system for migrating data from disparate source systems to an amalgamated data lake, the system comprising:
- a receiver, located at a data repository, operable to receive a plurality of data files, said data files comprising unstructured data;
- a transmitter, located at the data repository, operable to transmit a copy of the plurality of files to an edge node, said edge node being a single system within a data lake that receives files and transfer files, said data lake external to the data repository, said data lake being a single system storage location for storage of raw enterprise data, semi-structured enterprise data, structured enterprise data and binary data;
- a tabulator, located at the data repository, operable to tabulate a copy of the plurality of data files;
- the transmitter, located at the data repository further operable to transmit the tabulated copy of the plurality of data files to a database within the data repository;
- a second transmitter, located at the database within the data repository, operable to transmit the tabulated copy of the plurality of data files to a stage table, said stage table being a system within the data lake in which unstructured files are initially structured into structured files;
- a third transmitter, located at the edge node within the data lake, operable to transmit the copy of the plurality of files from the edge node to the stage table;
- a processor, located at the stage table, operable to:
  - identify unstructured data within the stage table;
  - tabulate the unstructured data within the stage table; and
  - identify and remove duplicate data from stage table: and
- a memory operable to store the stage table.

11. The system of claim 10, further comprising a fourth transmitter, located at the stage table, operable to transmit unique, tabulated data from the stage table to a permanent table.

12. The system of claim 11, wherein the unique, tabulated data is packaged into a permanent load insert statement prior to be transmitted to the permanent table.

13. The system of claim 12, wherein:
- the permanent load insert statement is a data warehouse software project script built on the data lake; and
- the script is operable to append the unique, tabulated data to the permanent table within the data lake.

14. The system of claim 13, further comprising a viewing module within the data lake, said viewing module pointing to the permanent table, said viewing module being operable to generate a view of the tabulated data included in the permanent table.

* * * * *